US008848703B2

(12) United States Patent
Sano

(10) Patent No.: US 8,848,703 B2
(45) Date of Patent: Sep. 30, 2014

(54) ON-CHIP ROUTER AND MULTI-CORE SYSTEM USING THE SAME

(75) Inventor: Toru Sano, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 36 days.

(21) Appl. No.: 13/191,212

(22) Filed: Jul. 26, 2011

(65) Prior Publication Data

US 2012/0185633 A1    Jul. 19, 2012

(30) Foreign Application Priority Data

Jan. 13, 2011    (JP) .................................. 2011-005106

(51) Int. Cl.
*H04L 12/28*    (2006.01)
*G06F 15/173*    (2006.01)

(52) U.S. Cl.
CPC .............................. *G06F 15/17381* (2013.01)
USPC ...................................................... 370/389

(58) Field of Classification Search
USPC ................... 709/205, 213, 214; 370/216, 235, 370/395.42
See application file for complete search history.

(56) References Cited

U.S. PATENT DOCUMENTS

| 6,021,470 | A | 2/2000 | Frank et al. | |
|---|---|---|---|---|
| 6,912,608 | B2 * | 6/2005 | Wolff et al. | 710/100 |
| 7,218,605 | B2 * | 5/2007 | Ochiai et al. | 370/216 |
| 7,274,700 | B2 | 9/2007 | Jin et al. | |
| 7,433,301 | B2 * | 10/2008 | Akahane et al. | 370/218 |
| 7,764,672 | B2 * | 7/2010 | Moriwaki | 370/389 |
| 7,995,599 | B2 * | 8/2011 | Angiolini et al. | 370/419 |
| 8,352,628 | B2 | 1/2013 | Maruccia et al. | |
| 8,423,749 | B2 | 4/2013 | Mejdrich et al. | |
| 8,495,643 | B2 | 7/2013 | Kupferschmidt et al. | |
| 2002/0176355 | A1 * | 11/2002 | Mimms et al. | 370/216 |
| 2005/0078708 | A1 | 4/2005 | Bender et al. | |

(Continued)

FOREIGN PATENT DOCUMENTS

| JP | 2006-254449 | 9/2006 |
|---|---|---|
| JP | 2007-110706 | 4/2007 |

(Continued)

OTHER PUBLICATIONS

John Kim, Low-Cost Router Microarchitecture for On-Chip Networks, KAIST, Microarchitecture, 2009. MICRO-42. 42nd Annual IEEE/ACM International Symposium, p. 255-256.*

(Continued)

*Primary Examiner* — Hassan Kizou
*Assistant Examiner* — Abdullahi Ahmed
(74) *Attorney, Agent, or Firm* — Knobbe, Martens, Olson & Bear LLP

(57) ABSTRACT

A table for changing destination has a destination address in a shared memory and an identifier of a router directly connected to a destination core, in association with each other, and is set by a source core. A search unit performs a first search for searching whether the table has an effective entry having the same address as the destination address in the shared memory, and stored in a header of a write request packet received by the source core. A route calculation unit performs a route calculation with a destination that is a router of an identifier of the entry, if the effective entry is found as a result of the first search. A header generator stores the router identifier obtained by the route calculation in a hop router field of the header of the write request packet, and sets a rerouted flag representing a change in destination.

19 Claims, 10 Drawing Sheets

(56) References Cited

U.S. PATENT DOCUMENTS

| | | |
|---|---|---|
| 2005/0078709 A1 | 4/2005 | Kunisch |
| 2006/0088051 A1 | 4/2006 | Mulligan |
| 2006/0203825 A1* | 9/2006 | Beigne et al. ............ 370/395.42 |
| 2006/0209846 A1 | 9/2006 | Clermidy et al. |
| 2007/0115939 A1 | 5/2007 | Lee et al. |
| 2008/0013532 A1 | 1/2008 | Garner et al. |
| 2008/0019290 A1 | 1/2008 | Suzuki |
| 2008/0069094 A1 | 3/2008 | Lee et al. |
| 2008/0205432 A1 | 8/2008 | Gangwal |
| 2010/0183015 A1* | 7/2010 | Inoue et al. .............. 370/395.42 |
| 2010/0202449 A1 | 8/2010 | Moscibroda et al. |
| 2011/0002405 A1 | 1/2011 | Raveendran |
| 2011/0026405 A1 | 2/2011 | Takagi et al. |
| 2011/0035530 A1 | 2/2011 | Takagi et al. |
| 2011/0280250 A1* | 11/2011 | Inoue ........................... 370/401 |
| 2011/0317691 A1 | 12/2011 | Kajihara |
| 2013/0064091 A1* | 3/2013 | Gratz et al. ................... 370/235 |

FOREIGN PATENT DOCUMENTS

| | | |
|---|---|---|
| JP | 2008-518511 | 5/2008 |
| JP | 2009-37273 | 2/2009 |
| JP | 2009-37279 | 2/2009 |

OTHER PUBLICATIONS

U.S. Appl. No. 13/598,389, filed Aug. 29, 2012, Sano.

Soteriou, et al., "A High-Throughput Distributed Shared-Buffer NoC Router", IEEE Computer Architecture Letters, vol. 8, No. 1, Jan.-Jun. 2009.

* cited by examiner

| V | Dest. Address | Dest. Router ID | |
|---|---|---|---|
| 1 | 0x31B8_9BC0 | 10 | ← ENTRY 0 |
| 0 | don't care | don't care | ← ENTRY 1 |

FIG. 5

| V | Dest. Address | Dest. Router ID |
|---|---|---|
| 1 | 0x31B8_9BC0 | 16 |
| 0 | don't care | don't care |

ENTRY 0 (row 1), ENTRY 1 (row 2)

FIG. 11

ON-CHIP ROUTER AND MULTI-CORE SYSTEM USING THE SAME

CROSS-REFERENCE TO RELATED APPLICATIONS

This application is based upon and claims the benefit of priority from the prior Japanese Patent Application No. 2011-5106, filed on Jan. 13, 2011, the entire contents of which are incorporated herein by reference.

FIELD

Embodiments described herein relate generally to an on-chip router and a multi-core system using the same.

BACKGROUND

In shared-memory multi-core systems, communication between processor cores (hereinafter referred to as "cores") is performed through a shared memory. First, a core A sends a write request packet to the shared memory through an on-chip router (hereinafter referred to as "router"). Data included in a write request packet is written at a predetermined address in the shared memory. Thereafter, a core B requiring the data of the predetermined address sends a read request packet for reading data to the shared memory, and acquires data written by the core A.

Accordingly, in the inter-core communication of the shared-memory multi-core system, data is sent and received through the shared memory. A problem is that there is large latency in the communication. Further, another problem is that temporary usage of the shared memory in the inter-core communication causes a burden on the shared memory.

In a so-called message passing inter-core communication method, data is directly sent from the core A to the core B not through the shared memory. In this method, there is another problem, even though the latency can be reduced. Because it is necessary to provide a dedicated buffer for use in the inter-core communication, for each core, there are several problems, such as an increase in the installation cost, an increase in the chip area, an increase in power consumption. Further, it is necessary to assign a global address accessible by another core, to the dedicated buffer. A problem is a burden on a limited address space.

BRIEF DESCRIPTION OF THE DRAWINGS

FIG. 5 is a diagram showing an example of a table for changing destination.

FIG. 11 is a diagram showing an example of a table for changing destination in a fifth embodiment.

DETAILED DESCRIPTION

Figure 1:
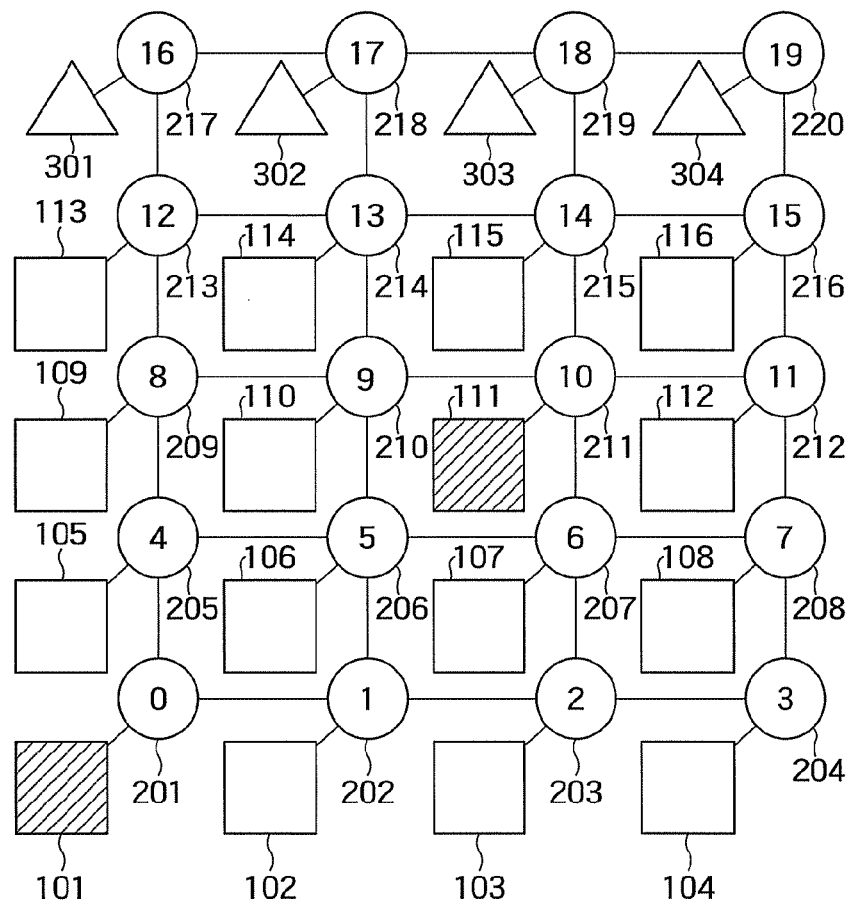
FIG. 1 is a diagram showing a schematic configuration of a shared-memory multi-core system according to an embodiment.

An on-chip router according to an embodiment performs inter-core communication in a shared-memory multi-core system. The router includes a buffer, a switch unit, a table for changing destination, a search unit, a route calculation unit, a header generator.

The buffer is provided at each input port, and stores data received at the input port. The switch unit switches the output destination of a received packet in such a manner that the packet is sent from a desired output port. The table for changing destination stores destination addresses in a shared memory in association with identifiers of routers directly connected to the destination core, and is set by the source core. The search unit performs a first search for searching whether the table for changing destination has an effective entry having the same address as a particular destination address in the shared memory. This destination address is stored in the header of a write request packet received from the source core. As a result of the first search, if the table for changing destination has the effective entry, the route calculation unit performs the route calculation with a destination, that is, the router of the identifier field of the entry, using a source-routing method. The header generator stores an identifier of the router obtained in the route calculation, in a hop router field of the header of the write request packet. Then, the header generator sets a re-routed flag representing that the destination is changed.

Embodiments of the present invention will now be described with reference to the drawings. In the illustrations, the constituent elements having the same functions are denoted with the same reference numerals, and thus the specific descriptions of the same constituent elements will not repeatedly be given.

Descriptions will now be made to a configuration of a multi-core system according to each embodiment and a schematic configuration of a packet used in inter-core communications.

FIG. 1 shows a schematic configuration of a shared-memory multi-core system according to this embodiment. The multi-core system of FIG. 1 includes sixteen cores 101 to 116, twenty routers 201 to 220, and four shared memories 301 to 304.

The routers 201 to 220 are arranged in a matrix pattern, and form a mesh network. The routers 201 to 216 are connected to their corresponding cores 101 to 116, while the routers 217 to 220 are connected to their corresponding shared memories 301 to 304. For example, the router 201 is connected to the core 101, while the router 217 is connected to the shared memory 301. The cores are connected with each other and to the shared memories, through the routers connected in a mesh structure.

In FIG. 1, the numeral shown in each circle represents an identifier (ID) of each router. That is, the identifiers of the routers 201 to 220 are respectively 0 to 19. The shared memories 301 to 304 may possibly have a cache function.

Figure 2:
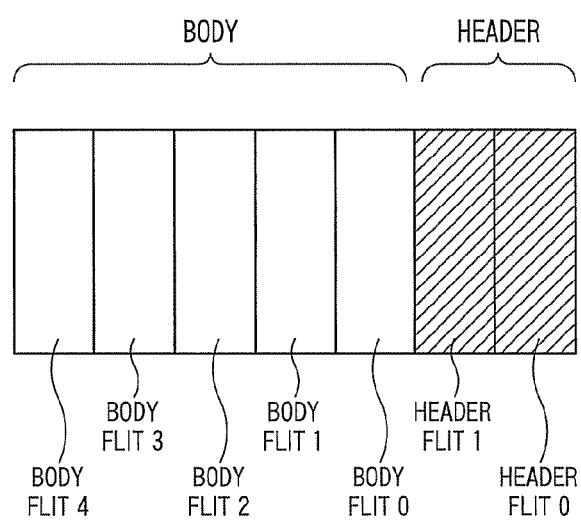
FIG. 2 is a diagram showing a configuration of a packet used in inter-core communication of the multi-core system.

A configuration of a packet used in the communication in the multi-core system will now be described using FIG. 2. The packet includes a header and a body. The header stores information representing the destination or the like. The body stores writing data or reading data or the like. The header and the body are composed of data units called Flit. In the example of the packet shown in FIG. 2, the header is composed of two header flits "0" and "1", while the body is composed of five body flits "0" to "4".

A method for transferring a packet will now be described. The packet transfer method includes a source routing (fixed routing) method and an adaptive routing method. In the source routing method, the router connected to the source core decides the transfer route of the packet in accordance with the destination address. That is, the router previously decides all the routers through which the packet passes. Thus, in the source routing method, the transfer route cannot be changed halfway through the transfer. In the adaptive routing method, each router which receives the packet performs a route calculation, in consideration with the destination address, the congestion of the network or the like. As a result of this calculation, the router decides the next transfer destination of the packet. In this adaptive routing, the transfer route is decided by each router having received the packet.

First to fifth embodiments of the present invention will now be described.

First Embodiment

In the first embodiment, the source routing method is adapted. In the first embodiment, the inter-core communication is asynchronously performed.

Figure 3:
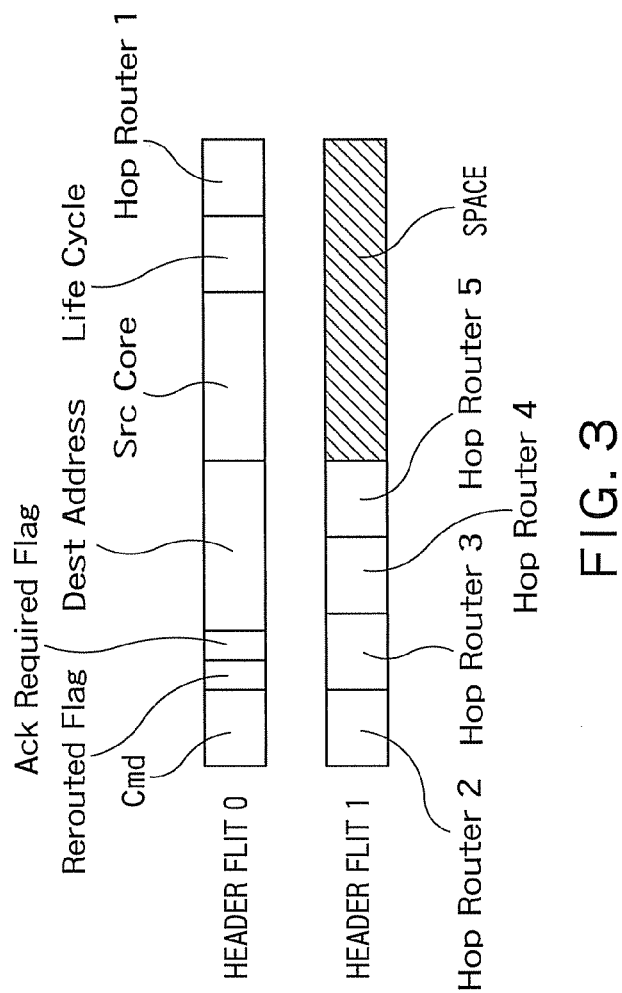
FIG. 3 is a diagram specifically showing a header of a packet in a source routing method.

The header of a packet in the source routing method will specifically be described using FIG. 3. The header flit 0 includes a command field (Cmd), a rerouted flag (Rerouted Flag), an Ack required flag, a destination address field (Dest Address), a source core field (Src Core), a life cycle field (Life Cycle) and a hop router field (Hop Router 1). The header flit 1 includes hop router fields (Hop Router 2-5).

The command field indicates the kind of a packet. For example, in the case of a write request packet, the command field stores a symbol implying "write". In the case of a read request packet, the command field stores a symbol implying "read". The rerouted flag represents that the destination of the packet has been changed.

The Ack required flag is one for the source core to require receipt information. In the first embodiment, the inter-core communication is asynchronously performed. Thus, the Ack required flag stores "0". The destination address field stores a destination address in the shared memory. The source core field stores an identifier of the source core.

The life cycle field indicates the packet's life. The lifecycle value set in this field depends on the characteristics of the network, or the like. For example, the initial value of "20" is stored in the life cycle field.

The hop router field stores an identifier of a router through which the packet passes. The number of hop router fields changes in accordance with the number of relay stages of the routers. The router connected to the source core stores, in the header, identifiers of all routers through which the packet reaches the destination core or the router connected to the shared memory. Thus, plural header flits are necessary, in accordance with the number of relay stages of the routers.

Each router provided in the multi-core system can acknowledge whether the router itself is connected to the destination core, by referring to the last field of the hop router fields of the received packet. That is, if the identifier stored in the last hop router field is the same as its own identifier, the router itself can acknowledge that it is connected to the destination core.

Figure 4:
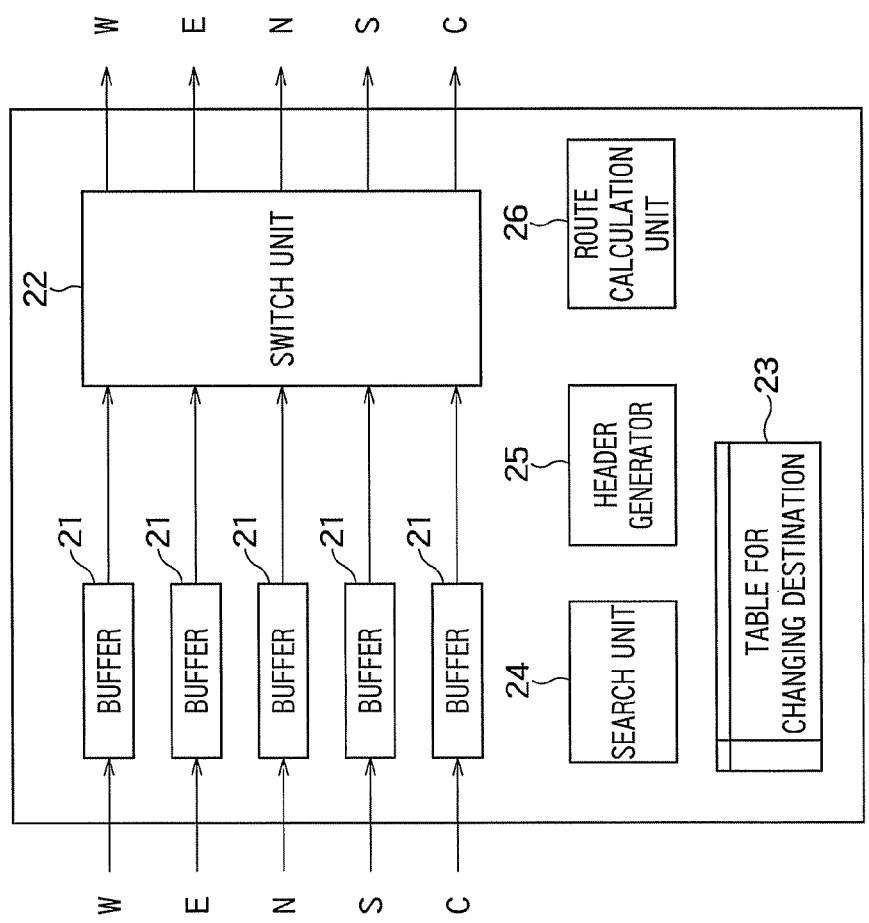
FIG. 4 is a diagram showing a configuration of a router according to an embodiment.

FIG. 4 shows an example of a configuration of a router according to the first embodiment. The router of FIG. 4 has five input ports and five output ports. Each of the input ports and the output ports is expressed with either west direction (W), east direction (E), north direction (N), south direction (S), or core direction (C). In this case, the number of input/output ports changes in accordance with the arrangement position of each router. For example, the router 201 has input/output ports in the core, north, and east directions, while the router 202 has input/output ports in the core, west, east and north directions.

The router has a buffer 21 provided at each input port, a switch unit 22, a table 23 for changing destination (destination changing table 23), a search unit 24, a header generator 25, and a route calculation unit 26.

The buffer 21 stores data received at the input port. The depth (size) of the buffer 21 is 1 Flit or larger (e.g. 4 to 8 Flits). The switch unit 22 switches the output destination of the packet such that the received packet is sent from a desired output port. This switch unit 22 is controlled by the route calculation unit 26.

The table 23 for changing destination is a table in which the destination addresses in the shared memory and the identifiers of the routers connected to the destination core, are in association with each other. This table 23 for changing destination is set by the source core. The source core can perform writing in the table 23 for changing destination of the router connected to itself, like accessing its control register.

FIG. 5 shows an example of the table 23 for changing destination. The table 23 for changing destination of FIG. 5 is composed of a data element "V" for storing a V flag (Valid Flag) representing data effectiveness, a data element "Dest. Address" for storing the destination address in the shared memory, and a data element "Dest. Router ID" for storing the identifier of the destination router. In this case, one entry is composed of a set of the V flag, the destination address, and the identifier of the destination router. In FIG. 5, the entry 0 has a set V flag, thus is an effective entry. In the entry 0, the destination address is 0x31B8__9BC0 (hereinafter referred to as address DA1), and the destination router identifier is "10" (router 211). In FIG. 5, the number of entries is one. However, the table 23 for changing destination can have plural entries.

Descriptions will now specifically be made to the inter-core communication in the first embodiment, when the core 101 is the source core, and the core 111 is the destination core.

Before sending a write request packet, the source core 101 performs setting for the router 201 connected to the core 101 itself. Specifically, the core 101 writes the destination address DA1 and the identifier "10" of the router 211 as the identifier of the destination router, in the entry 0 of the table 23 for changing destination. Further, the core 101 writes "1" in the V flag, representing that the entry 0 is effective.

After the table for changing destination is set, the core 101 generates a write request packet, and sends the generated packet to the router 201. In the write request packet, the address DA1 of the shared memory 301 is stored in the destination address field.

The search unit 24 of the router 201 searches whether an effective entry exists in the table 23 for changing destination. In this case, the effective entry is one having the same address as the destination address stored in the header of the write request packet received from the core 101. As a result of the search, if there is the effective entry having the same address, the route calculation unit 26 of the router 201 performs the route calculation with a destination that is the router of the identifier stored in the "Dest. Router ID" field of the effective entry. In the case of the first embodiment, the route calculation is performed using the source routing method.

Figure 6:
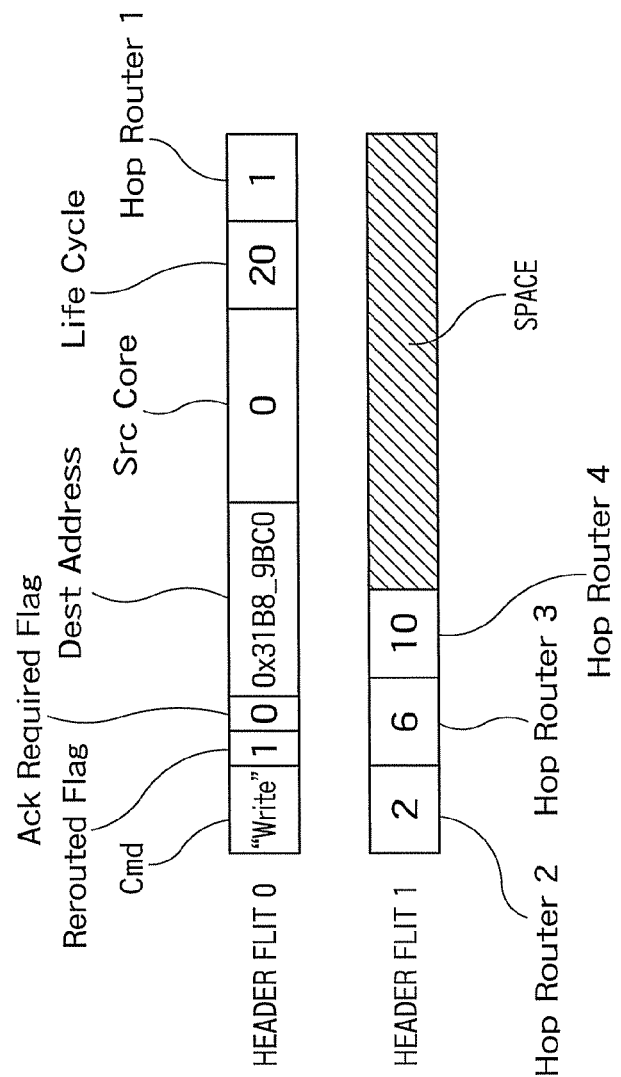
FIG. 6 is a diagram specifically showing a header generated by a router directly connected to a source core.

The header generator 25 stores the identifiers of all of the obtained routers in the hop router fields, in routing order of the packets, and sets "1" in the rerouted flag. FIG. 6 shows an example of the thus generated header of the packet. In FIG. 6, each hop router field stores the identifier "1", "2", "6", or "10" of the router obtained in the route calculation.

After this, the switch unit 22 switches the output destination of the packet to the E direction port as the direction of the router 202 (ID=1), under the control of the route calculation unit 26. As a result, the write request packet with the changed destination is sent from the router 201 to the router 202.

Figure 7:
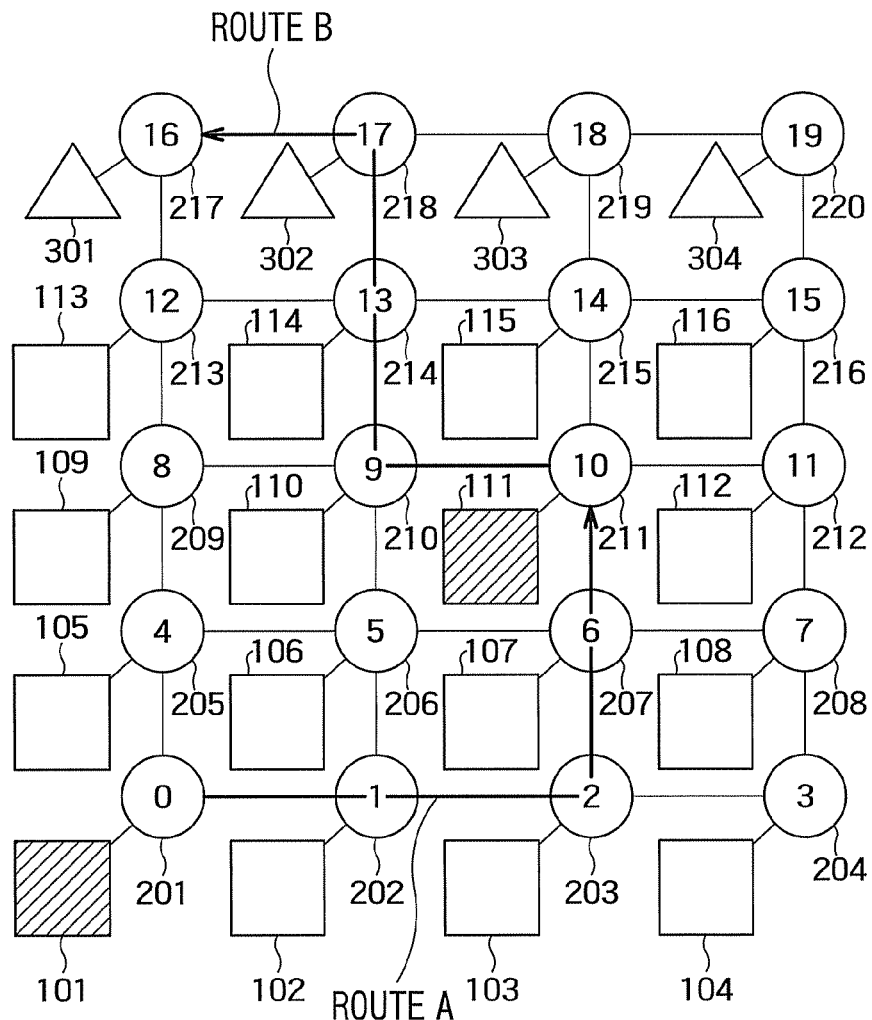
FIG. 7 is a diagram showing an example of a transfer route of packets in a first embodiment.

FIG. 7 is a diagram showing an example of a transfer route of a packet. The write request packet reaches the router 211 all way through the routers 201, 202, 203 and 207, as shown with a route A of FIG. 7.

The core 111 sends a read request packet to the router 211, when to read data of the address DA1. The destination address field of the read request packet stores the address DA1.

When the router 211 receives a read request packet from the core 111, the search unit 24 searches whether a particular write request packet is stored in a buffer. This particular packet has the same address as the destination address of the read request packet, and having a rerouted flag "1". As a result of the search, if the packet is stored in the buffer, the router 211 rewrites the header of the write request packet, and generates the header of a response packet corresponding to the read request packet, using the header generator 25. Then, the generated header is sent to the core 111. The destination core 111 can quickly read the data of the address DA1. When generating a response packet, the write request packet stored in the buffer is deleted.

Descriptions will now be made to a problem due to asynchronous inter-core communication and to a method for dealing with this problem. In this description, consider a case wherein the destination core 111 reads another address DA2, after the write request packet from the core 101 reaches the router 211. When there is no more space in the buffer 21 of the router 211, the read response packet having the data of the address DA2 stays in the router on the way to the destination, and can never reach the router 211. This results in malfunction that the core 111 freezes.

In this embodiment, the router 211 transfers the already reached write request packet to the shared memory based on the life cycle value, when a timeout occurs. The event "timeout" occurs when the life-cycle value equals to a predetermined value (e.g. "0"). Specifically, the router 211 decrements the life-cycle value by 1 every time one cycle elapses, when there is a write request packet with the rerouted flag "1" in its own buffer. When a timeout occurs, the router 211 transfers the write request packet to the shared memory 301. The router 211 calculates the transfer route with the address DA1 of the write request packet as a destination, using the header generator 25, and stores the obtained router identifier in the hop router field. The rerouted flag of the write request packet is set to "0". As a result, the write request packet is sent from the router 211 to the shared memory 301, and is transferred, for example, along a route B shown in FIG. 7.

As described above, the write request packet staying at the route 211 is transferred to the shared memory, thereby creating a space in the buffer 21 of the router 211. The response packet corresponding to the read request from the core 111 can reach the router 211. This results in avoiding the case wherein the core 111 freezes.

According to the first embodiment, it is possible to realize the inter-core communication not via the shared memory, without newly providing a buffer for inter-core communication. Hence, it is possible to reduce latency in the inter-core communication, as compared with the conventional cases.

According to the first embodiment, when the shared memory has a cache function, it is possible to increase a hit rate by decreasing the replacing of cache lines, as compared with the conventional cases. This results in improving the performance of the entire multi-core system.

Second Embodiment

In a second embodiment, the inter-core communication is performed with synchronization, using an Ack required flag of a write request packet. Upon reception of the write request packet with the Ack required flag, the router connected to the destination core informs the source core about completion of packet transfer. The source core sends information regarding completion of data wiring, to the destination core. After this, the destination core sends a read request packet. As a result, synchronous inter-core communication can be achieved, as will specifically be described below.

The core 101 is set as a source core, while the core 111 is set as a destination core. The router 201 having received a write request packet from the source core 101 sets "1" in the Ack required flag of the write request packet. The router 211 connected to the destination core 111 informs the core 101 about completion of packet transfer.

This information may be given through a dedicated signal line or the like, or may be given using a special packet that is distinguishable from normal data transfer. In the latter case, the special packet preferably passes a packet for data transfer at a router buffer. This can avoid a situation that synchronization is not completely achieved because the special packet cannot reach the source core 101 by the interference of a normal packet.

Upon reception of information about completion of packet transfer from the router 211, the source core 101 informs the core 111 about the completion of data writing, using a synchronization mechanism (shared variable in the memory or interruption) provided by the multi-core system. Upon reception of this information, the core 111 sends a read request packet to the address DA1. The following operations are the same as those of the first embodiment, and thus will not specifically be described again.

According to the second embodiment, upon reception of the information about the completion of data writing from the source core, the destination core requests for data reading. Thus, the destination core can certainly read the written data from the source core. According to the second embodiment, it is possible to reduce latency in the inter-core communication.

Third Embodiment

Figure 8:
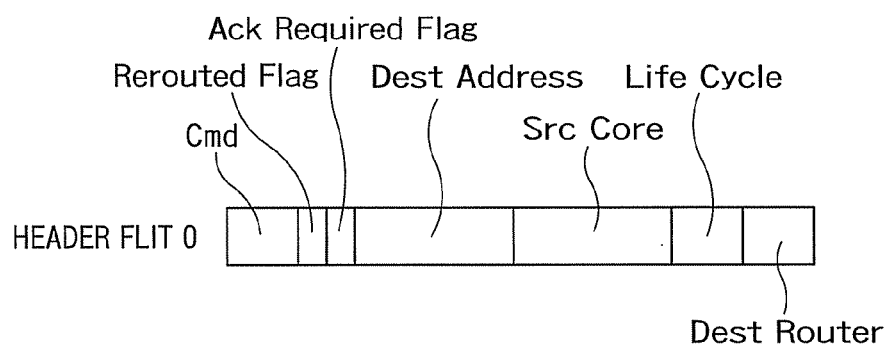
FIG. 8 is a diagram specifically showing a header of a packet in an adaptive routing method.

A third embodiment of the present invention will now be described. Descriptions will now be made to a configuration of a header of a packet in an adaptive routing method, using FIG. 8. What differs from the source routing method is that a destination router field (Dest Router) is provided in place of the hop router filed. The destination router field stores an identifier of a router connected to the destination core. Conventionally, the destination router field does not exist, and the route calculation is done using information of the destination address field.

Figure 9:
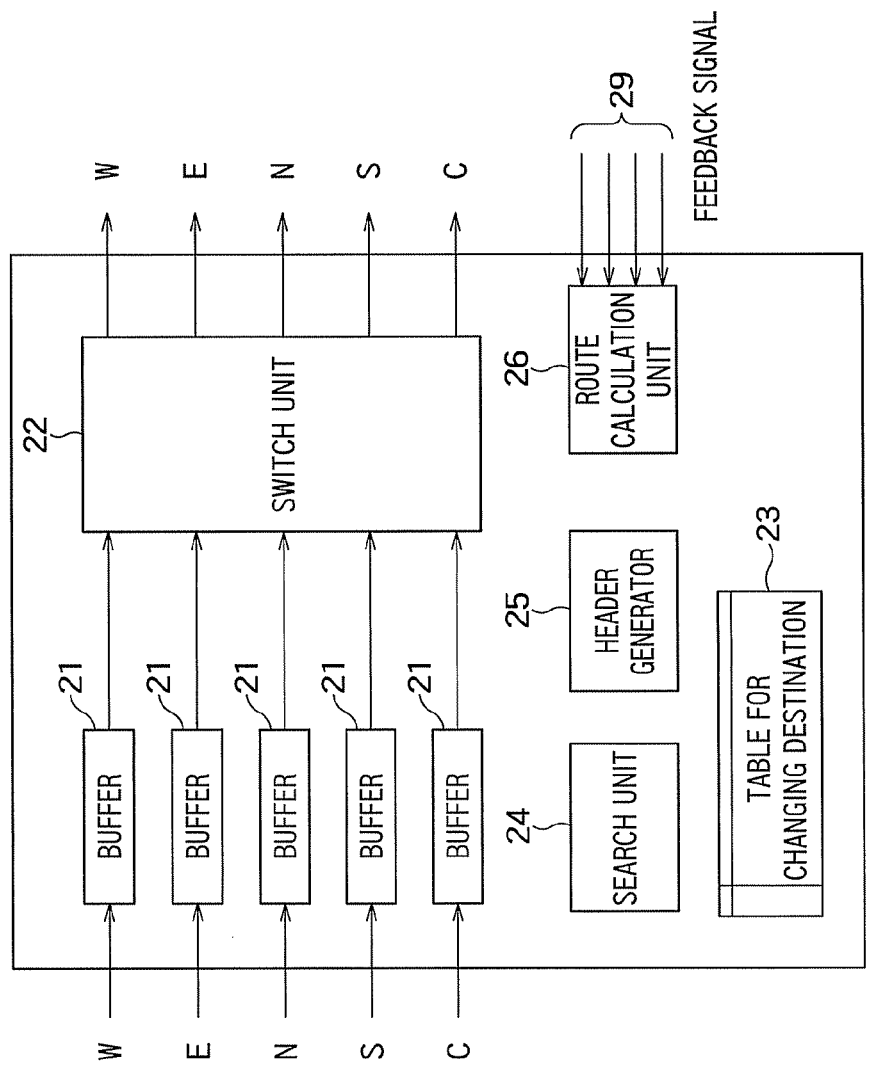
FIG. 9 is a diagram showing a configuration of a router according to a third embodiment.

FIG. 9 shows a configuration of a router according to the third embodiment. The router of FIG. 9 includes the buffers 21, the switch unit 22, the table 23 for changing destination, the search unit 24, the header generator 25, and the route calculation unit 26.

Further, the router according to the third embodiment has feedback lines 29 for sending information regarding the status (whether data is embedded or not) of the buffer of an adjacent router. The route calculation unit 26 performs route calculation in consideration of the information from the feedback lines 29, for determining the output destination of the packet.

Descriptions will now specifically be made to inter-core communication according to the third embodiment, when the core 101 is set as the source core and the core 111 is set as the destination core.

The source core 101 sets the table 23 for changing destination of the router 201, before sending the write request packet. That is, the core 101 writes the V flag "1", the address DA1 and the router identifier "10", in the entry of the table 23 for changing destination.

The core 101 sends a write request packet having the address DA1 as the destination address, to the router 201. The search unit 24 of the router 201 searches whether the table 23 for changing destination has an effective entry having the same address as the destination address of the write request packet. As a result of the search, if the table has the effective entry having the same address, the header generator 25 stores the destination router identifier of the entry in the destination router field, and sets "1" in the rerouted flag. At this time, the header generator 25 sets "0" in the asynchronism, and sets "1" in the synchronism, for the Ack required flag.

The route calculation unit 26 of the router 201 performs the route calculation with the stored router identifier as a destination, and determines the next transfer destination. The route calculation unit 26 controls the switch unit 22 in accordance with this determination. The write request packet is sent from the router 201 to the determined router.

When a rerouted flag is set, the route calculation unit 26 of the relay router to which the packet is transferred performs the route calculation for the router of the identifier stored in the destination router field as the transfer destination, so as to determine the output destination of the packet. When no rerouted flag is set, the route calculation unit 26 performs the route calculation with the address stored in the destination address field as the transfer destination.

The write request packet from the core 101 is transferred, and reaches the router 211 as the last destination router. The following operations are the same as those of the first embodiment in the asynchronism, and are the same as those of the second embodiment in the synchronism, and thus will not specifically be described again.

According to the third embodiment, like the first embodiment, it is possible to reduce latency of inter-core communication, as compared with the conventional technique. In addition, when the shared memory has a cache function, it is possible to improve the performance of the entire multi-core system, as compared with the conventional technique.

According to the third embodiment, in synchronous inter-core communication, like the second embodiment, the destination core can certainly read writing data from the source core. Thus, it is possible to reduce latency of inter-core communications, as compared with the conventional technique.

Forth Embodiment

A fourth embodiment relates to an operation performed when a write request packet cannot reach the router connected to the destination core, due to the network congestion or the like. Descriptions will now be made to an exemplary case wherein a write request packet is transferred from the core 101 to the core 111. The routing method may be any of the source routing method or the adaptive routing method.

The destination of the write request packet sent from the core 101 is changed to the router 211 in accordance with the setting of the table 23 for changing destination in the router 201. Then, the packet is sent from an output port which is obtained in the route calculation, and is transferred to the router 211.

Figure 10:
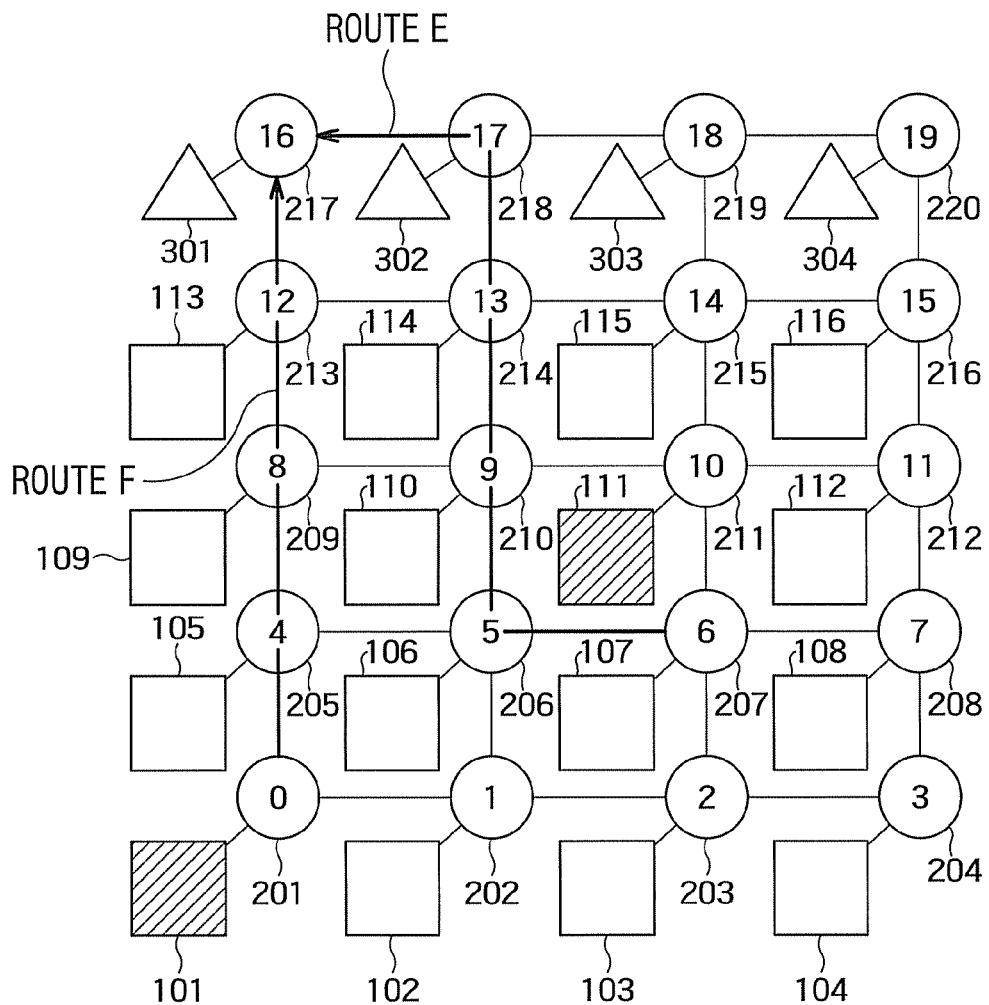
FIG. 10 is a diagram showing an example of a transfer route of packets in a fourth embodiment.

Consider a case in which the write request packet stays at a router 207 (ID=6) on the way to the destination and thus cannot reach the router 211, because the route to the router 211 is congested. In the fourth embodiment, the router 207 gives up to transfer the packet to the router 211, and changes the destination to the shared memory 301 having the destination address. Specifically, the route calculation unit 26 of the router 207 performs route calculation with the address DA1 as a destination, for obtaining a new transfer route. The header generator 25 sets the rerouted flag of the write request packet to "0". The write request packet is transferred from the router 207 to the shared memory 301. A route E of FIG. 10 is an example of this transfer route.

After this, when the core 111 requests for data reading, the buffer of the router 211 has no write request packet. Hence, data of the destination address is read out from the shared memory, like the conventional technique.

Descriptions will now be made to a case wherein the router 201 connected to the source core 101 judges that the route to the router 211 is congested. In this case, the write request packet is transferred to the memory 301 at the first.

Upon reception of a packet from the core 101, the router 201 refers to the table 23 for changing destination, and judges whether the destination of the packet should be changed. When judged that the destination of the packet should be changed, the following processes are performed.

When the router 201 judges that the route to the router 211 is congested, the route calculation unit 26 of the router 201 performs the route calculation with the address DA1 as a destination. The header generator 25 sets the rerouted flag of the write request packet to "0". The write request packet is transferred to the shared memory 301. In the method for judging whether the network is congested, information, for example, from the feedback lines 29 is used.

In the fourth embodiment, at the stage where it is judged that it is difficult to reach the destination router, the operation of the router is changed, the transferring of the packet to the destination core is stopped, and the write request packet is sent to the shared memory. There is no need to change the operations of the source core and the destination core. As a result, according to the fourth embodiment, it is possible to flexibly switch between inter-core communication through the shared memory and the inter-core communication not through the shared memory, in accordance with the congestion situation of the network.

Fifth Embodiment

In a fifth embodiment, multicast transferring of the packet is performed. In the fifth embodiment, data from the source core is stored in a buffer of the router connected to the shared memory, and data is sent from this buffer to plural cores in response to a read request from the destination core. As a result, writing/reading of data is not done into/from the shared memory. Thus, it is possible to realize multicasting with very little latency as compared with a conventional shared memory system for inter-core communication.

Descriptions will now be made to a case wherein data is transferred from the source core 101 to two cores 111 and 114. In this description, the synchronous adaptive routing method is used. However, the fifth embodiment is applicable to the source routing method and asynchronous system.

The source core 101 sets the table 23 for changing destination of the router 201, before sending a write request packet. For example, as shown in FIG. 11, the core 101 writes the V flag "1", the address DA1, and the identifier "16" of the router connected to the shared memory 301, in the entry of the table 23 for changing destination.

The core 101 sends a write request packet having the address DA1 as its destination, to the router 201. The search unit 24 of the router 201 searches whether the table 23 for changing destination has an effective entry having the same address as the destination address of the write request packet. As a result of the search, when there is an effective entry having the same address, the header generator 25 stores the identifier "16" of this entry in the destination router field, and sets "1" in the rerouted flag. At this time, the header generator 25 sets "1" in the Ack required flag.

The route calculation unit 26 of the router 201 performs route calculation for the router of the identifier stored in the destination router field as a destination, and determines the next transfer destination. The route calculation unit 26 controls the switch unit 22, in accordance with this determination. As a result, the write request packet is transferred along, for example, a route H of FIG. 12, and reaches the router 217 at the end.

The search unit of the router 217 searches for a packet in which the identifier stored in the destination router field is the same as that of the router 217. When there is found such a packet, the router 217 informs the core 101 about completion of the transfer.

Upon reception of information about completion of the transfer from the router 217, the core 101 is synchronized with the core 111 and the core 114 by means of an interruption or the like. The core 111 and the core 114 send a read request packet having the address DA1 as its destination. The read request packet is transferred to the shared memory 301, and reaches the router 217.

Upon reception of the read request packet, the search unit of the router 217 searches for a write request packet from its buffer 21. This write request packet corresponds to the rerouted flag "1", and has the destination address of the destination address field which is the same as the destination address of the read request packet. The header generator of the router 217 rewrites the corresponding write request packet, and generates a header of a response packet corresponding to the read request packet.

Figure 12:
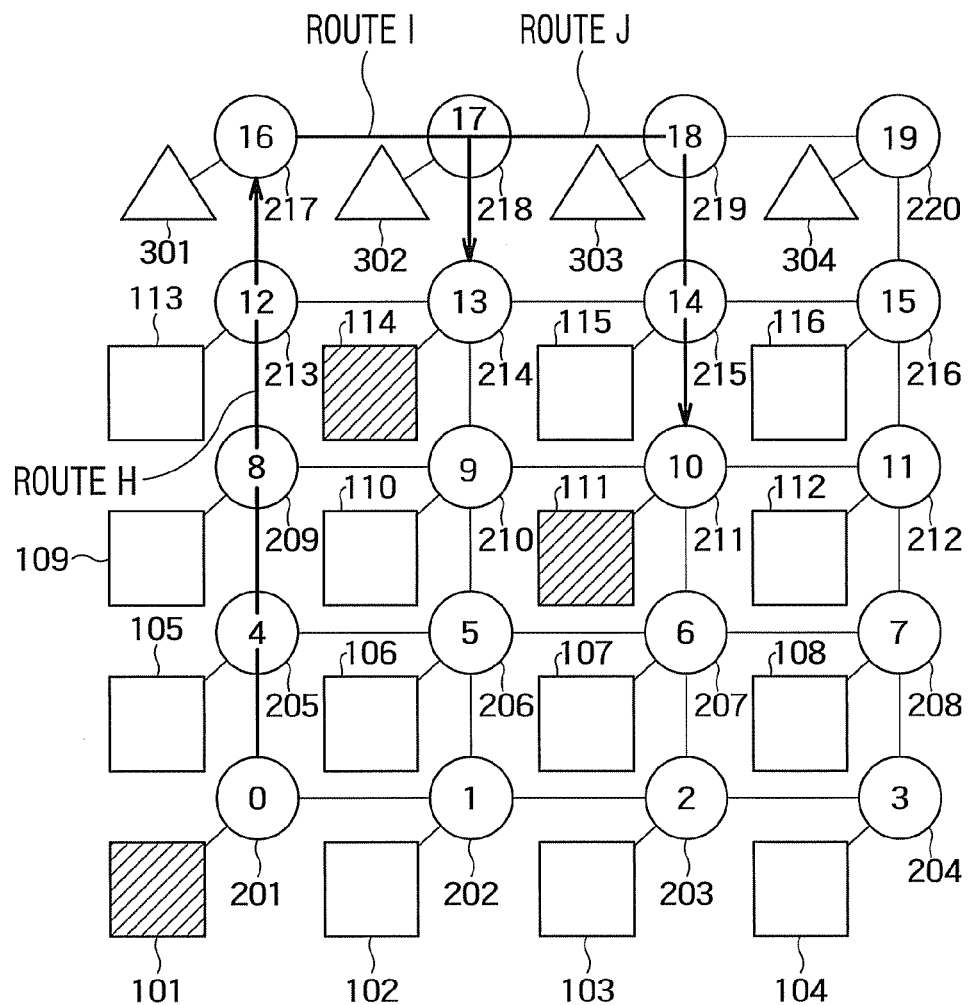
FIG. 12 is a diagram showing an example of a transfer route of packets in the fifth embodiment.

The generated response packet is sent to the core 111 and the core 114 as a read result. The write request packet stored in the buffer is stored as is, because it corresponds to the multicast. After the multicast ends, the packet is written into the shared memory 301 and is deleted from the buffer. The timing in which the multicast ends may be set using a timeout with the life-cycle value. A route I and a route J of FIG. 12 show examples of transfer routes of the response packet.

According to the fifth embodiment, it is possible to reduce latency for a certain time not writing/reading data into/from the shared memory.

Accordingly, the embodiments of the present invention have been described. In the embodiments, the mesh multi-core network has been described by way of example. However, the present invention is not limited to this, and is applicable to a ring or torus network, as long as routers are connected to their corresponding cores and shared memory.

In the embodiment for performing asynchronous inter-core communications, the packet is directly transferred to the destination core and also to the shared memory. In this case, data may be written at the destination address of the shared memory. By so doing, it is possible to reduce latency by directly transferring the packet in the identified inter-core communication. In addition, it is possible to read data from the shared memory, when another core issues a read request afterwards.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An on-chip router comprising:
   a plurality of input ports configured to receive one or more packets, the packets each comprising a destination address;
   a plurality of output ports configured to send one or more packets;
   a plurality of buffers, each associated with an input port, configured to store received packets;
   a switch configured to switch, between the plurality of output ports, the output port from which the received packets are sent;
   a destination changing table configured to store a destination address in a shared memory, and to store an identifier of a router in association with the destination address, both of which are set by a source core;
   a search unit configured to determine whether the destination address stored in the destination changing table is the same as the destination address in a received write request packet;
   a route calculator configured to calculate a route to the router identified in association with the destination address, when the destination address stored in the destination changing table is the same as the destination address in the received write request packet; and
   a header generator configured to store, in the write request packet, an identifier of the router representing the route calculated by the route calculator and to set a rerouted flag indicating a change in destination.

2. The on-chip router of claim 1, wherein
   the search unit is further configured to determine whether a write request packet is stored in the buffer comprises the same destination address as a destination address in a read request packet received from a destination core, and having the set rerouted flag, and
   the header generator is further configured to rewrite a header of the write request packet and to generate a header of a response packet corresponding to the read request packet, when the buffer stores the write request packet comprising the same destination address as the destination address in the read request packet.

3. The on-chip router of claim 2, wherein
   a router connected to the destination core is configured to inform the source core about completion of transferring the write request packet, when a flag requesting acknowledgement is set in the write request packet sent from the source core.

4. The on-chip router of claim 2, wherein
the header generator is configured to decrement a life-cycle value of the write request packet stored in the buffer, every time one cycle elapses, when the rerouted flag of the write request packet is set,
the route calculator is configured to calculate a route to the destination address in the write request packet, when the life-cycle value is decremented to a first value, and
the header generator is configured to store, in the write request packet, a router identifier calculated by the route calculator, and to unset the rerouted flag.

5. The on-chip router of claim 2, wherein
the route calculator is configured to calculate a route to the destination address in the received packet, when there is no more space in the buffer of a router of a transfer destination; and
the header generator is configured to unset the rerouted flag when there is no more space in the buffer of the router of the transfer destination.

6. The on-chip router of claim 2, wherein
the identifier of the router stored in the destination changing table comprises an identifier of a router connected to the shared memory.

7. The on-chip router of claim 2, wherein
the identifier of the router stored in the destination changing table comprises an identifier of a router connected to the destination core.

8. The on-chip router of claim 1, wherein
a router connected to the destination core is configured to inform the source core about completion of transferring the write request packet, when flag requesting acknowledgement is set in the write request packet sent from the source core.

9. The on-chip router of claim 1, wherein
the header generator is configured to decrement a life-cycle value of the write request packet stored in the buffer, every time one cycle elapses, when the rerouted flag of the write request packet is set,
the route calculator is configured to calculate a route to the destination address in the write request packet, when the life-cycle value is decremented to a first value, and
the header generator is configured to store a router identifier, calculated by the route calculator, in the write request packet, and to unset the rerouted flag.

10. The on-chip router of claim 1, wherein
the route calculator is configured to calculate a route to the destination address in the received packet when there is no more space in the buffer of a router of a transfer destination, and
the header generator is configured to unset the rerouted flag when there is no more space in the buffer of the router of the transfer destination.

11. The on-chip router of claim 1, wherein
the route calculator is configured to calculate a route using a source routing method.

12. The on-chip router of claim 1, wherein
the route calculator is configured to calculate a route using an adaptive routing method.

13. A multi-core system comprising:
a plurality of processor cores; and
a plurality of on-chip routers configured to be connected to the processor cores, and configured to transfer one or more packets sent and received between the processor cores,
wherein each of the on-chip routers comprises:
a plurality of input ports configured to receive one or more packets, the packets each comprising a destination address;
a plurality of output ports configured to send one or more packets;
a plurality of buffers, each associated with an input port, configured to store received packets;
a switch configured to switch, between the plurality of output ports, the output port from which the received packets are sent;
a destination changing table configured to store a destination address in a shared memory, and to store an identifier of a router in association with the destination address, both of which are set by a source core;
a search unit configured to determine whether the destination address stored in the destination changing table is the same as the destination address in a received write request packet;
a route calculator configured to calculate a route to the router identified in association with the destination address, when the destination address stored in the destination changing table is the same as the destination address in the received write request packet; and
a header generator configured to store, in the write request packet, an identifier of the router representing the route calculated by the route calculator and to set a rerouted flag indicating a change in destination.

14. The multi-core system of claim 13, wherein
the search unit is further configured to determine whether a write request packet is stored in the buffer comprises the same destination address as a destination address in a read request packet received from a destination core, and having the set rerouted flag, and
the header generator is further configured to rewrite a header of the write request packet and to generate a header of a response packet corresponding to the read request packet, when the buffer stores the write request packet comprising the same destination address as the destination address in the read request packet.

15. The multi-core system of claim 14, wherein
a router connected to the destination core is configured to inform the source core about completion of transferring the write request packet, when a flag requesting acknowledgement is set in the write request packet sent from the source core.

16. The multi-core system of claim 14, wherein
the header generator is configured to decrement a life-cycle value of the write request packet stored in the buffer, every time one cycle elapses, when the rerouted flag of the write request packet is set,
the route calculator is configured to calculate a route to the destination address in the write request packet, when the life-cycle value is decremented to a first value, and
the header generator is configured to store, in the write request packet, a router identifier calculated by the route calculator, and to unset the rerouted flag.

17. The multi-core system of claim 14, wherein
the route calculator is configured to calculate a route to the destination address in the received packet, when there is no more space in the buffer of a router of a transfer destination; and
the header generator is configured to unset the rerouted flag when there is no more space in the buffer of the router of the transfer destination.

18. The multi-core system of claim 14, wherein
the identifier of the router stored in the destination changing table comprises an identifier of a router connected to the shared memory.

19. The multi-core system of claim 14, wherein
the identifier of the router stored in the destination changing table comprises an identifier of a router connected to the destination core.

* * * * *